United States Patent [19]

Brockelsby, III

[11] Patent Number: 4,498,659
[45] Date of Patent: Feb. 12, 1985

[54] CONICAL LINE-PULLING CARRIER

[76] Inventor: Pete Brockelsby, III, 880 King Ave., Columbus, Ohio 43212

[21] Appl. No.: 484,063

[22] Filed: Apr. 11, 1983

Related U.S. Application Data

[63] Continuation-in-part of Ser. No. 354,128, Mar. 2, 1982, abandoned.

[51] Int. Cl.³ .................................................. B66F 3/00
[52] U.S. Cl. ................................................... 254/134.4
[58] Field of Search .............. 254/134.3 R, 134.3 FT, 254/134.4; 15/104.3 G, 104.3 SN

[56] References Cited

U.S. PATENT DOCUMENTS

| | | | |
|---|---|---|---|
| 252,956 | 1/1882 | Loane | 254/134.4 |
| 382,257 | 5/1888 | Geyser | 254/134.4 |
| 934,520 | 9/1909 | Greenan | 254/134.4 |
| 1,033,587 | 7/1912 | Hodgman | 254/134.4 |
| 1,035,994 | 8/1912 | Mueller | 254/134.4 |
| 1,036,114 | 8/1912 | Hodgman | 254/134.4 |
| 1,851,435 | 3/1932 | Jessup | 254/134.4 |
| 2,287,257 | 6/1942 | Lear | 254/134.4 |
| 2,794,197 | 6/1957 | Crane | 254/134.4 |

FOREIGN PATENT DOCUMENTS

| | | | |
|---|---|---|---|
| 2009942 | 10/1970 | Fed. Rep. of Germany | 254/134.4 |
| 1950645 | 4/1971 | Fed. Rep. of Germany | 254/134.4 |

*Primary Examiner*—Robert C. Watson
*Attorney, Agent, or Firm*—John L. Gray

[57] ABSTRACT

A hollow conical line-pulling carrier which is connected with the line being pulled by a connection on the interior of the carrier spaced upwardly from the base of the cone for pulling a messenger line through electrical conduit. The conical portion is made of extremely lightweight plastic, permitting it to be either blown through the conduit or sucked therethrough. Because the connection to the cone is spaced upwardly from the base, it permits the base of the cone to adjust to debris, imperfections, or water in the conduit without having the cone collapse and thus permit the messenger line to continue to be pulled through the conduit.

6 Claims, 3 Drawing Figures

CONICAL LINE-PULLING CARRIER

This patent application is a continuation-in-part of copending U.S. patent application Ser. No. 354,128, filed Mar. 2, 1982 now abandoned.

BACKGROUND OF THE INVENTION

It is common practice in installing conduit for housing, electrical, telephone, and other lines to assemble the conduit, which in some cases is placed underground, and when the conduit has been finally assembled to send a carrier device through the conduit leading a messenger line which may then be attached to the appropriate electrical line which can be drawn through the conduit.

Examples of line-pulling carriers in use today are shown in U.S. patent Ser. No. 3,119,600, Bitter, and U.S. patent Ser. No. 3,246,878, Hamrick. The line-pulling carrier is made of a flexible, spongy material so that, theoretically, it may move over water or accumulated debris in the conduit, and also go around curves and bends and be flexible enough so that when it passes indentations in the conduit its movement is not impeded.

In practice, however, these devices often will stick and cause great difficulty in threading electrical materials through conduit.

Earlier devices utilized flexible materials which could be blown through a conduit such as in U.S. patent Ser. No. 1,033,587, Hodgman, and U.S. patent Ser. No. 382,257, Geyser. Both of these disclosures involve the use of a relatively stiff member.

In the case of Hodgman, its item 1, a flexible band 10 is holding the material in a position against the inner wall of the conduit.

In the case of Geyser, there is a shaft 2 which is rigid.

Neither of these devices would permit the carrier to go around bends in the conduit because of the rigid shafts and U.S. patent Ser. No. 1,033,587, Hodgman, would have a great deal of friction on the interior of the shaft which would limit the length of conduit through which it could traverse.

Also in the prior art is U.S. patent Ser. No. 1,851,435, Jessup, which at 15 discloses a cone and a truncated cone connected together at their bases or connected at their bases to a small cylindrical portion. The messenger line is attached to the truncated portion below the base of the cones. Because of the shape of this device, it would tend to collapse when it met an obstacle with the result that it would not continue to pull the messenger through the conduit.

SUMMARY OF THE INVENTION

The instant invention of applicant overcomes the disadvantages of the prior art by providing an extremely thin plastic, conical-shaped carrier which is attached to the messenger interially of the cone and spaced upwardly from the base thereof thus maintaining a pulling or pushing force through the conduit but permitting the periphery to collapse when necessary in order to pass obstructions or constrictions in the conduit while maintaining sufficient volume and shape so that the carrier will continue to be pushed or pulled through the conduit.

It is therefore an object of this invention to provide a carrier to be used to pull a messenger line through a conduit which is cheap, reliable, and which will deform so as to pass over debris in the conduit or constrictions therein.

It is a further object of this invention to provide a carrier of such lightweight construction that it may either be blown through the conduit by means of a fan, or it may be sucked through a conduit with a suction device at the outer end of the conduit.

It is a still further object of this invention to provide a carrier of such construction and lightweight that even in intermediate metallic tubing, which is light gauge conduit, utilizing said screws to hold it together so that air can get out, this carrier will function.

Additional objects and advantages of the present invention will become more readily apparent to those skilled in the art when the following general statements and descriptions are read in the light of the appended drawings.

DETAILED DESCRIPTION OF THE INVENTION

Figure 1:
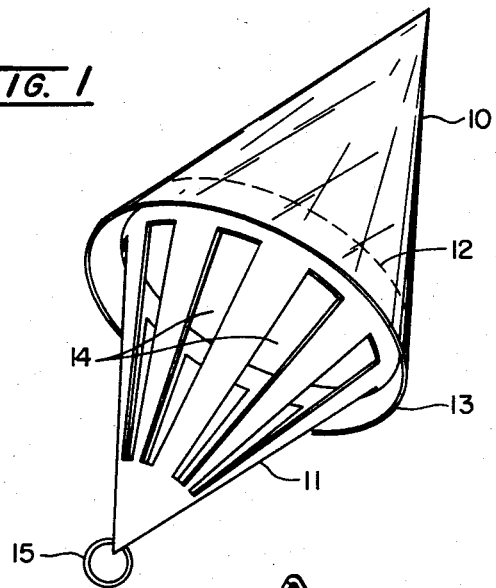
FIG. 1 is a perspective view of one version of the carrier constituting the invention.

Referring now more particularly to FIG. 1, the conical carrier is shown at 10 and is preferably made from a flexible, one mill thick, plastic material such as polyethylene. Attached to the interior of the carrier 10 is a reverse conical member 11 fastened to the interior of carrier 10 at the beaded portion 12 spaced inwardly from the base 13 of the carrier 10. Reverse conical member 11 is provided with a plurality of slots 14—14 to permit air to flow through into the interior of carrier 10. A ring 15 is provided at the base of reverse conical member 11 for attachment of the messenger.

Figure 2:
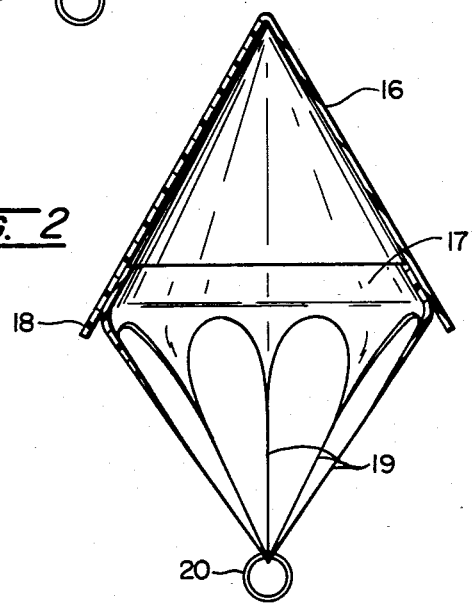
FIG. 2 is a side elevation sectional view of a modification of said carrier.

Referring now more particularly to FIG. 2, the conical portion 16, similar in construction to conical carrier 10, is provided with a web 17 connected around its periphery and spaced from its base 18 and provided with a plurality of dependent flexible strands 19—19, terminating in rings 20—20 which may be gathered together and through which the messenger line 22 may be tied. The strands 19—19 function the same as the elements separating the slots 14—14 of the device shown in FIG. 1.

Figure 3:
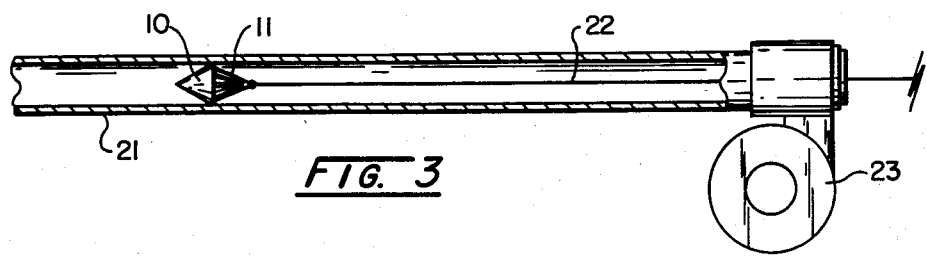
FIG. 3 shows the carrier in place in a conduit.

Referring now more particularly to FIG. 3, it will be seen that the carrier 10 (or carrier 16) is placed inside conduit 21 and is connected by means of reverse conical member 11 (or lines 19—19) to messenger line 22. A suitable blower 23 is attached to the end of the conduit 21 so as to permit air to be blown into the conduit 21 and thus forcing the carrier 10 (or carrier 16) through the conduit 21, pulling the messenger line 22 therethrough. Because the portion between the base of the carrier 10 (or carrier 16) and its point of attachment to that portion which is connected to the messenger line 22 and is spaced upwardly from the base 18, the carrier 10 (or carrier 16) can safely semi-collapse, if necessary, over debris or water in the conduit 21 as well as constrictions in the conduit 21 yet remain sufficiently full of air so that it will continue to be forced through the conduit 21 to pull the messenger line 22 therebehind.

Instead of using a blower 23, the carrier 10 (or carrier 16) is sufficiently lightweight that it may be sucked through the conduit 21 by means of a vacuum-producing unit at the opposite end.

Furthermore, since the unit is of such lightweight material it may be blown or sucked through the conduit 21 even if the joints in a conduit are not sealed such as would be the case when it is being sent through intermediate metallic tubing where the joints are not hermetically sealed.

While this invention has been described in its preferred embodiment, it is to be appreciated that variations therefrom may be made without departing from the true scope and spirit of the invention.

What is claimed is:

1. A carrier for pulling a messenger line through conduit comprising a single, unitary, lightweight, flexible, plastic cone whose base is approximately the same diameter as the interior of the conduit being traversed, a plurality of flexible strands, each of said strands being attached at one of its ends to, and each of said strands extending inwardly directly from, the interior of said cone only at a location essentially parallel to the base of said cone and spaced between said base and the apex of said cone, said strands being equi-spaced around the interior of said cone, the other end of each of said strands being joined together and attached to means to which a messenger line may be attached.

2. The carrier of claim 1 wherein the end of each of said strands which is attached to the interior of said cone is attached closer to said base than to the apex of said cone.

3. The carrier of claim 1 wherein the means to which a messenger line may be attached comprises a ring.

4. A carrier for pulling a messenger line through conduit comprising a single, unitary, lightweight, flexible, plastic cone whose base is approximately the same diameter as the interior of the conduit being traversed, a flexible conical-shaped member having slots equi-spaced by elements extending along the surface of said conical-shaped member in a direction from said base toward said apex of said conical member, the base of said conical-shaped member being attached to the interior of said cone only at a location essentially parallel to the base of said cone and spaced between said base and the apex of said cone, the elements being equi-spaced around the interior of said cone, the apex of said conical-shaped member being attached to means to which a messenger line may be attached.

5. The carrier of claim 4 wherein the means to which a messenger line may be attached comprises a ring.

6. The carrier of claim 4 wherein said elements are strands separating open spaces in said conical-shaped member.

* * * * *